(12) United States Patent
Hsieh

(10) Patent No.: US 10,981,803 B2
(45) Date of Patent: Apr. 20, 2021

(54) REGULATING TANK OF WASTEWATER TREATMENT SYSTEM

(71) Applicant: Kuan Yuan Paper Mfg. Co., Ltd., Miaoli (TW)

(72) Inventor: Kuang Yuan Hsieh, Miaoli (TW)

(73) Assignee: Kuan Yuan Paper Mfg. Co., Ltd., Zhunan Township (TW)

( * ) Notice: Subject to any disclaimer, the term of this patent is extended or adjusted under 35 U.S.C. 154(b) by 0 days.

(21) Appl. No.: 16/831,733

(22) Filed: Mar. 26, 2020

(65) Prior Publication Data

US 2020/0308020 A1 Oct. 1, 2020

(30) Foreign Application Priority Data

Mar. 29, 2019 (TW) .................................. 108111119

(51) Int. Cl.
*C02F 1/00* (2006.01)
*C02F 3/20* (2006.01)
*C02F 3/24* (2006.01)
*C02F 103/28* (2006.01)

(52) U.S. Cl.
CPC ................ *C02F 1/006* (2013.01); *C02F 3/20* (2013.01); *C02F 3/24* (2013.01); *C02F 2103/28* (2013.01); *C02F 2203/006* (2013.01)

(58) Field of Classification Search
CPC .... C02F 1/006; C02F 3/24; C02F 3/20; B01F 5/10; B01F 5/102

USPC .................................. 210/197; 366/136, 137
See application file for complete search history.

(56) References Cited

U.S. PATENT DOCUMENTS

| | | | | |
|---|---|---|---|---|
| 2,597,802 A | * | 5/1952 | Kappe ....................... | C02F 3/12 |
| | | | | 210/197 |
| 3,465,889 A | * | 9/1969 | Young, Jr. .......... | B01D 21/2444 |
| | | | | 210/538 |
| 4,202,762 A | * | 5/1980 | Fontein ............... | B01F 3/04758 |
| | | | | 210/629 |
| 4,332,484 A | * | 6/1982 | Peters .................... | A01C 3/026 |
| | | | | 137/563 |
| 4,512,665 A | * | 4/1985 | Cline ........................ | B01F 5/02 |
| | | | | 285/282 |
| 5,057,230 A | * | 10/1991 | Race ..................... | B01F 3/0876 |
| | | | | 210/758 |
| 5,490,934 A | * | 2/1996 | Schmid ..................... | C02F 3/28 |
| | | | | 210/614 |
| 2017/0096800 A1 | * | 4/2017 | Stearman .................. | B01F 5/10 |

* cited by examiner

*Primary Examiner* — Reinaldo Sanchez-Medina
*Assistant Examiner* — Nicole Gardner
(74) *Attorney, Agent, or Firm* — Wang Law Firm, Inc.

(57) ABSTRACT

A regulating tank of a wastewater treatment system includes a tank member having an annular wall to receive wastewater, a first overflow weir connected to an interior side of the annular wall of the tank member, and a first pump device having a first pump and a first return pipe. The first pump of the first pump device pumps wastewater in the tank member to the first overflow weir through the first return pipe, and then the wastewater flows back to the tank member from the first overflow weir to disturb the wastewater in the tank member.

10 Claims, 8 Drawing Sheets

REGULATING TANK OF WASTEWATER TREATMENT SYSTEM

BACKGROUND OF THE INVENTION

1. Technical Field

The present invention relates to a wastewater treatment system, and more particularly to a regulating tank of a wastewater treatment system.

2. Description of Related Art

Recycling of papers is getting more and more important in present days since shortage of natural resource is more and more serious. In order to separate fibers in waste paper and remove ink from fibers, it needs specified chemical solutions and water in aforesaid processes. As a result, it generates large amount of wastewater in the process of paper recycling.

Treatments of wastewater in paper recycling including coagulation process, biochemical process, and chemical process. Bacteria, such as anaerobic bacteria and aerobic bacteria, are used in biochemical process. Environment is deeply effects the works of bacteria, such as temperature and pH value of water. Typically, high temperature is bad for bacteria, and water temperature always increases in wastewater treatment. A conventional solution is adding chemical solution to help the works of bacteria instead of lowering the temperature. It only has limited effect.

BRIEF SUMMARY OF THE INVENTION

In view of the above, the primary objective of the present invention is to provide a regulating tank of a wastewater treatment system, which may lower water temperature and increase dissolved oxygen to help the works of aerobic bacteria in biochemical process.

In order to achieve the objective of the present invention, a regulating tank of a wastewater treatment system, which received wastewater from a primary settling tank, includes a tank member having an annular wall to receive the wastewater, a first overflow weir connected to an interior side of the annular wall of the tank member, and a first pump device having a first pump and a first return pipe, wherein the first pump is connected to the tank member, and the first return pipe has an end connected to the first pump and an opposite end associated with the first overflow weir.

The first pump of the first pump device pumps the wastewater in the tank member to the first overflow weir through the first return pipe, and then the wastewater flows back to the tank member from the first overflow weir to disturb the wastewater in the tank member.

In an embodiment, the first overflow weir is provided with a plurality of stop plates; the stop plates are separated from each other to form a flowing gap between each two of the neighboring stop plates.

In an embodiment, the regulating tank further includes a second overflow weir, having a plurality of terminals associated with the first overflow weir to communicate the second overflow weir with the first overflow weir.

In an embodiment, the regulating tank further includes a second pump device having a second pump and a second return pipe having an end connected to the second pump and an opposite end associated with the second overflow weir, whereby the second pump of the second pump device pumps the wastewater in the tank member to the second overflow weir through the second return pipe, and then the wastewater flows back to the tank member from the second overflow weir.

In an embodiment, the second overflow weir is provided with a plurality of stop plates; the stop plates are separated from each other to form a flowing gap between each two of the neighboring stop plates.

In an embodiment, the regulating tank further includes a frame connected to the tank member, wherein the second overflow weir is connected to the frame to be positioned over the tank member.

In an embodiment, the regulating tank further includes a circular pipe and a second pump device, wherein the circular pipe is connected to the tank member; the second pump device having a second pump and a second return pipe; the second pump is connected to the circular pipe, and the second return pipe has an end connected to the circular pipe and an opposite end associated with the second overflow weir, whereby the second pump of the second pump device pumps the wastewater in the tank member to the second overflow weir through the circular pipe and the second return pipe, and then the wastewater flows back to the tank member from the second overflow weir.

In an embodiment, the regulating tank further includes a plurality of nozzles connected to the circular pipe, wherein the nozzles eject the wastewater in the circular pipe into the tank member.

In an embodiment, each of the nozzles is provided with a controller to open and close the nozzle by command.

In an embodiment, the second overflow weir has a side overflow weir, which connects and communicates different parts of the second overflow weir.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

A wastewater treatment system of the preferred embodiment of the present invention includes a primary settling tank and a regulating tank connected to the primary settling tank through pipes. In the present embodiment, the primary settling tank is higher than regulating tank, so that wastewater flows to regulating tank from the primary settling tank by gravity.

Figure 1:
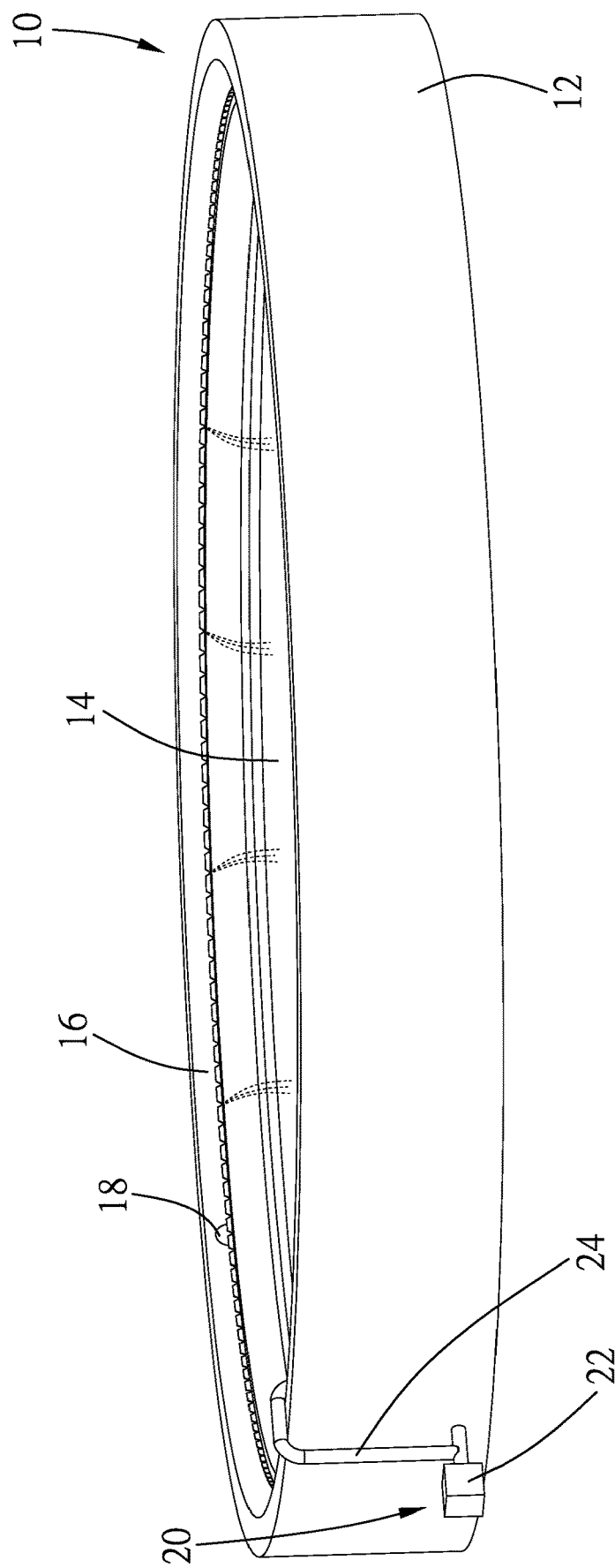
FIG. 1 is a perspective view of a preferred embodiment of the present invention.
Figure 2:
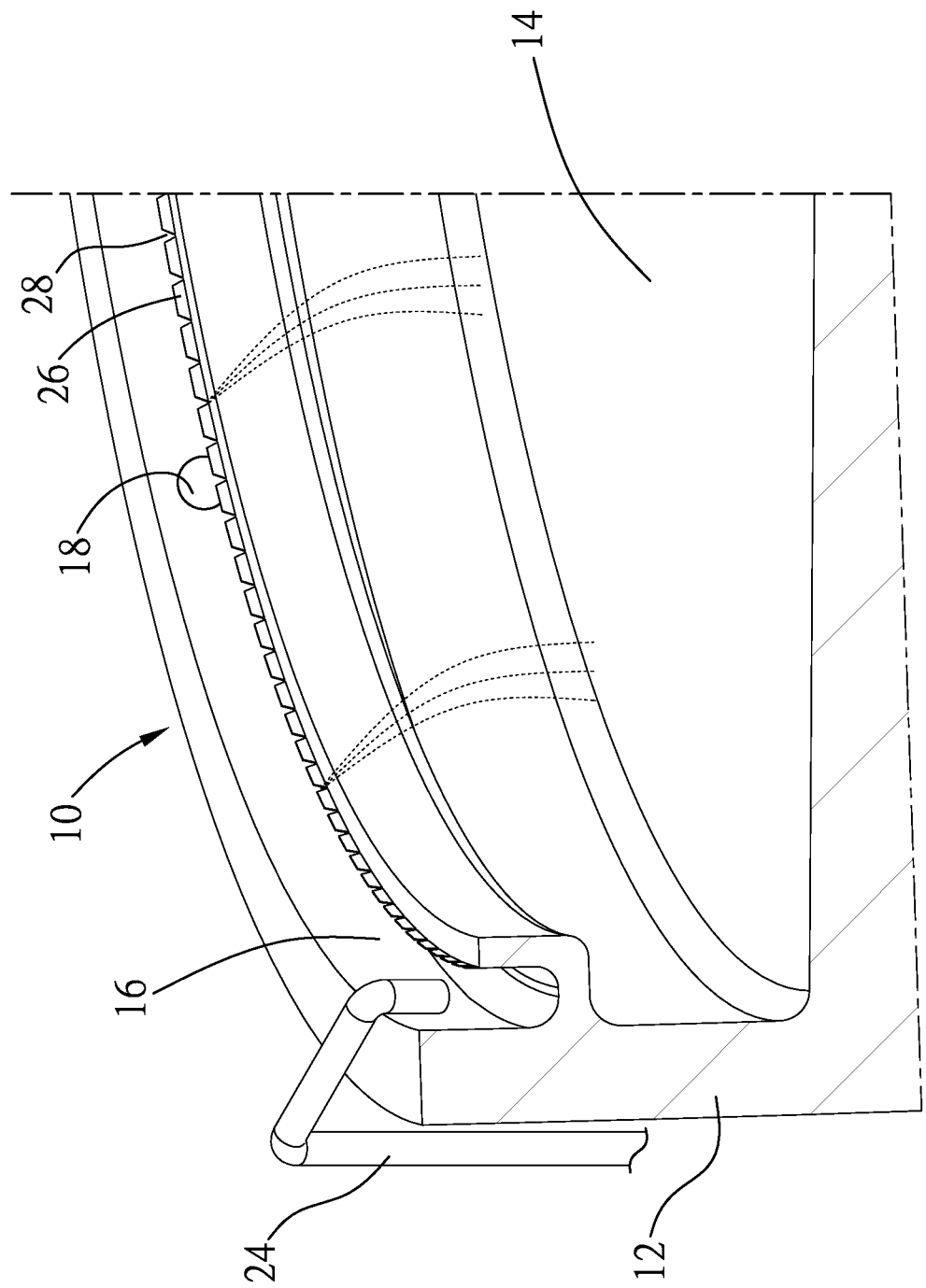
FIG. 2 is a sectional view in part of the preferred embodiment of the present invention.

As shown in FIGS. 1 and 2, the regulating tank includes a tank member 10. The tank member 10 has an annular wall 12 and a bottom to enclose a chamber 14 therein. The regulating tank further includes a first overflow weir 16 on an interior side of the annular wall 12. The annular wall 12 is provided with an inlet 18 associated with the first overflow weir 16. As shown in FIG. 1, a first pump device 20 includes a first pump 22 and a first return pipe 24. The first pump 22 pumps water in the chamber 14 to the first overflow weir 16 through the first return pipe 24.

As a result, wastewater flows to the tank member 10 of the regulating tank from the primary settling tank, and the first pump 22 pumps the wastewater to the first overflow weir 16 to create a circulation between the tank member 10 and the first overflow weir 16.

As shown in FIG. 2, the first overflow weir 16 is provided with a plurality of stop plates 26. The stop plates 26 are separated from each other to form a flowing gap 28 between each two of the neighboring stop plates 26. The wastewater flows back to the tank member 10 through the flowing gaps 28 of the first overflow weir 16.

Figure 3:
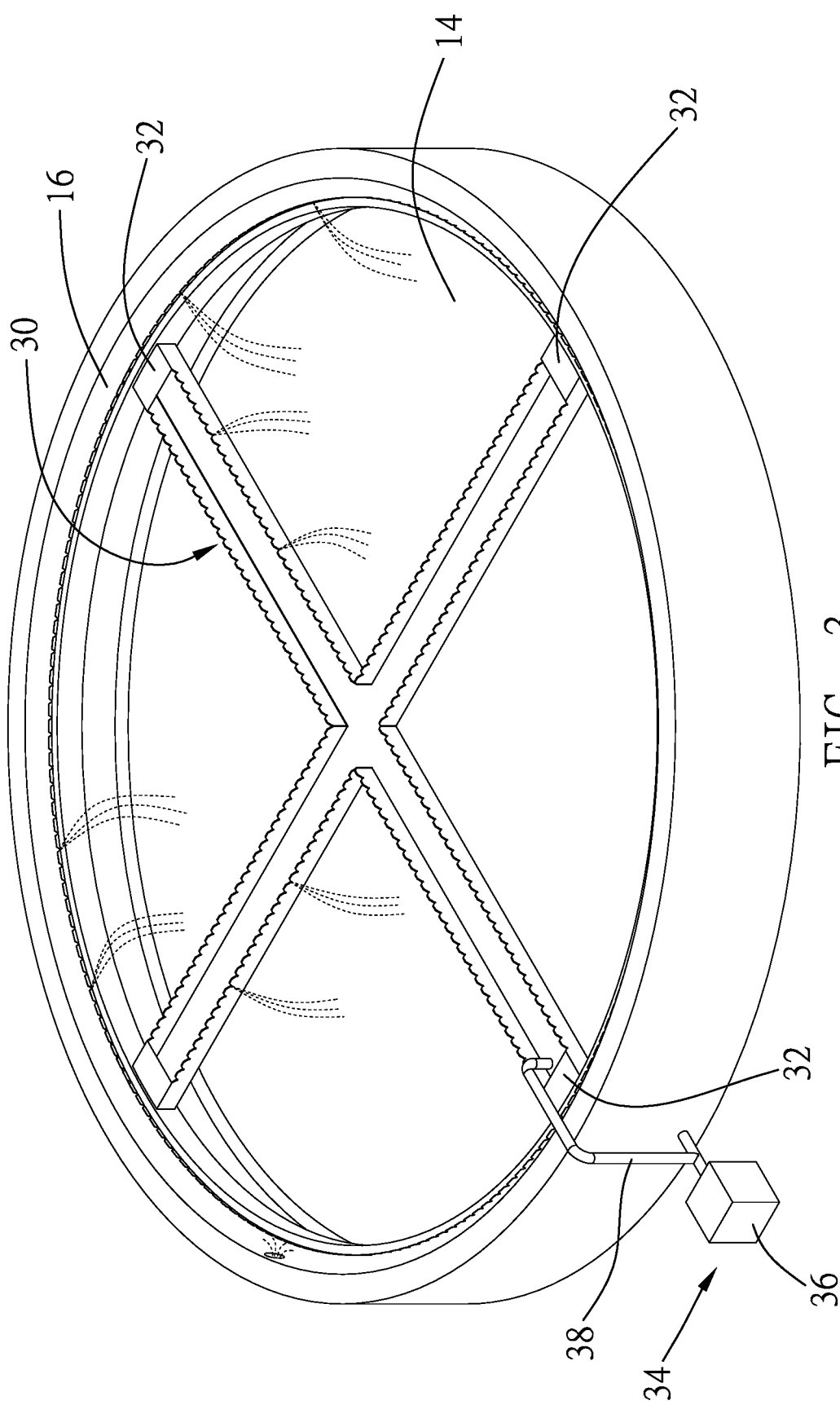
FIG. 3 is a perspective view of the preferred embodiment of the present invention, showing the first overflow weir.

As shown in FIG. 3, the present embodiment further includes a second overflow weir 30, which has a plurality of terminals 32 communicated with the first overflow weir 16. As a result, the wastewater may flow between the first overflow weir 16 and the second overflow weir 30.

The present embodiment further includes a second pump device 34, including a second pump 36 and a second return pipe 38. The second pump 36 pumps the wastewater in the tank member 10 to the second overflow weir 30 through the second return pipe 38 to create a circulation between the tank member 10 and the second overflow weir 30.

Figure 4:
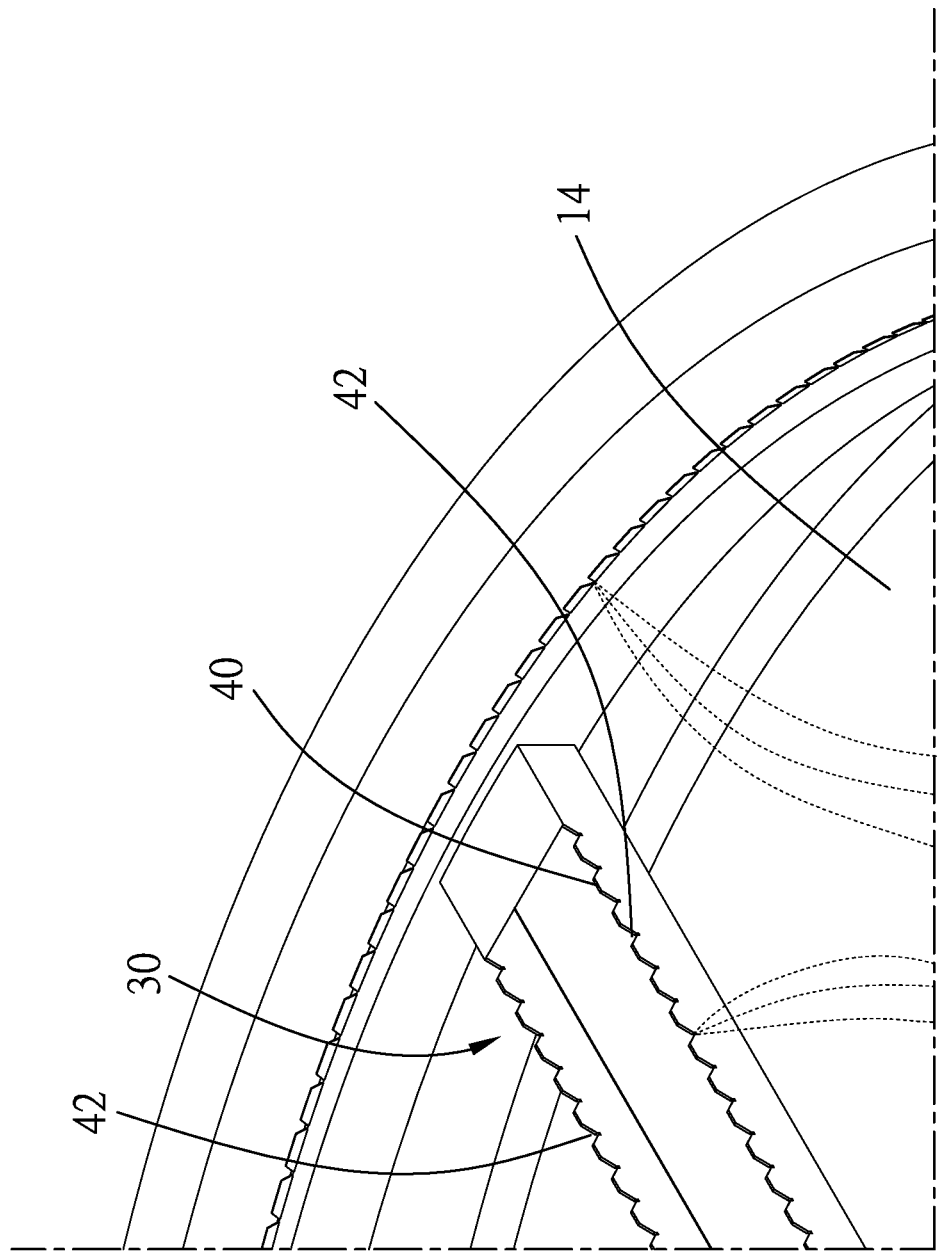
FIG. 4 is a perspective view in part of the preferred embodiment of the present invention, showing the second overflow weir.

As shown in FIG. 4, the second overflow weir 30 is provided with a plurality of stop plates 40. The stop plates 40 are separated from each other to form a flowing gap 42 between each two of the neighboring stop plates 40. The wastewater flows back to the tank member 10 through the flowing gaps 42 of the second overflow weir 30.

Figure 5:
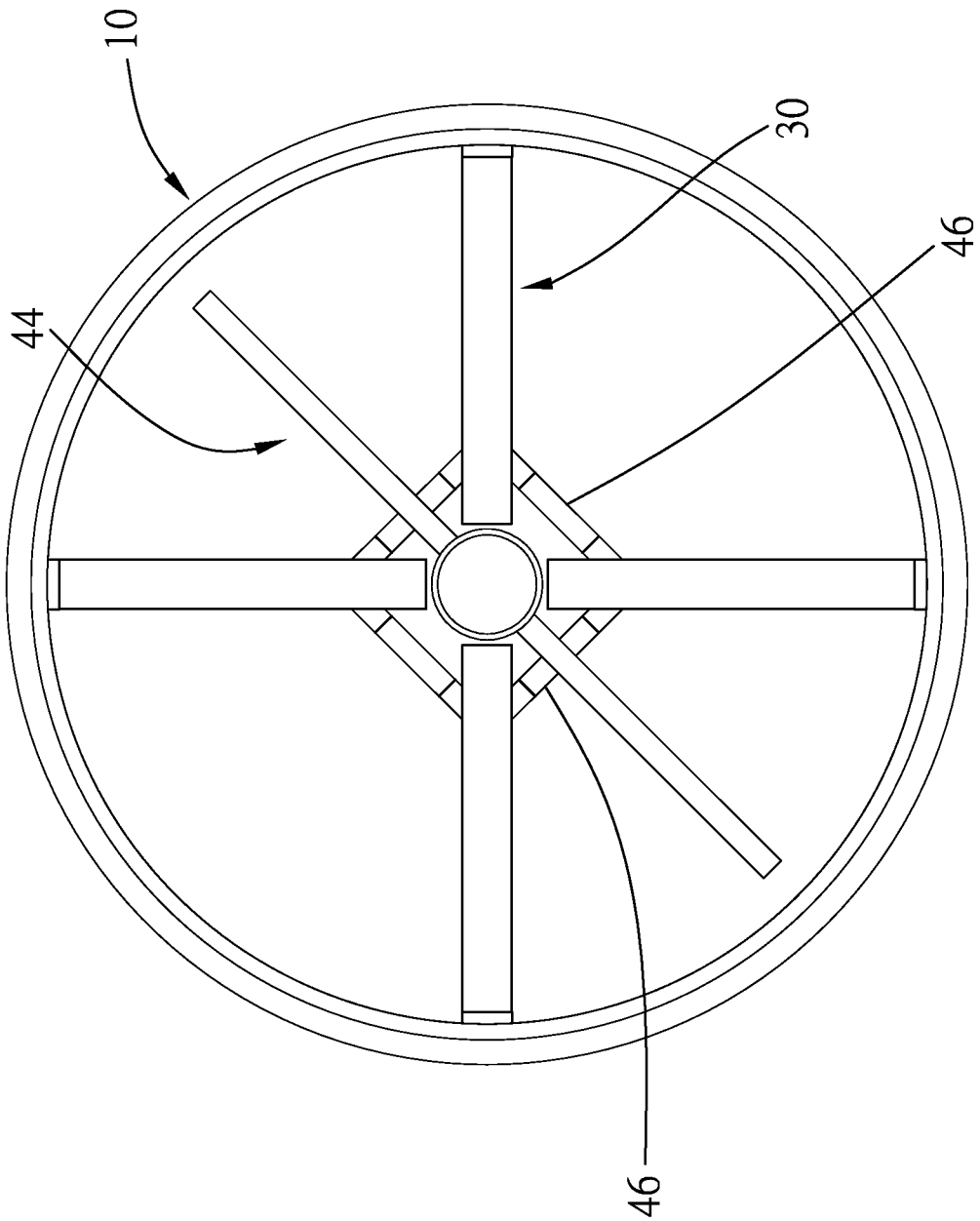
FIG. 5 is a top view of the preferred embodiment of the present invention, showing the scraping device.

As shown in FIG. 5, a scraping device 44 is provided in the tank member 10 to remove objects and bubbles on the wastewater surface of the wastewater in the tank member 10. In the present embodiment, the second overflow weir 30 is provided with a side overflow weir 46, which connects and communicates parts of the second overflow weir 30.

Figure 6:
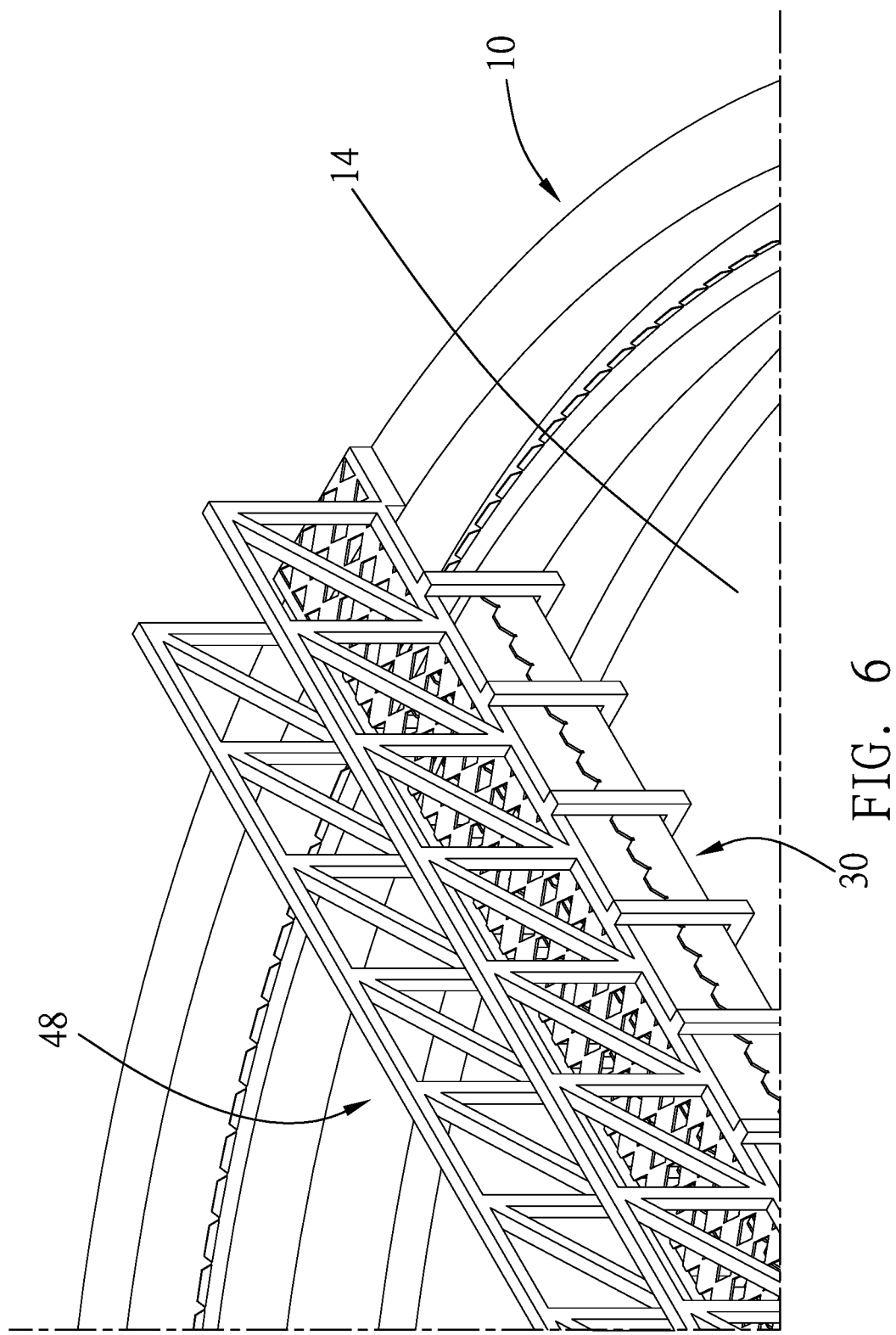
FIG. 6 is a perspective view in part of the preferred embodiment of the present invention, showing the frame and the second overflow weir.

As shown in FIG. 6, a frame 48 has ends connected to the tank member 10. The frame 48 is above the second overflow weir 30 and connected to the second overflow weir 30. The frame 48 has a cross shape as the second overflow weir 30, and four ends of the frame 48 are fixed to the tank member 10 to make the frame 48 cross over the tank member 10. The second overflow weir 30 is hung under the frame 48 to position the second overflow weir 30 over the tank member 10.

Figure 7:
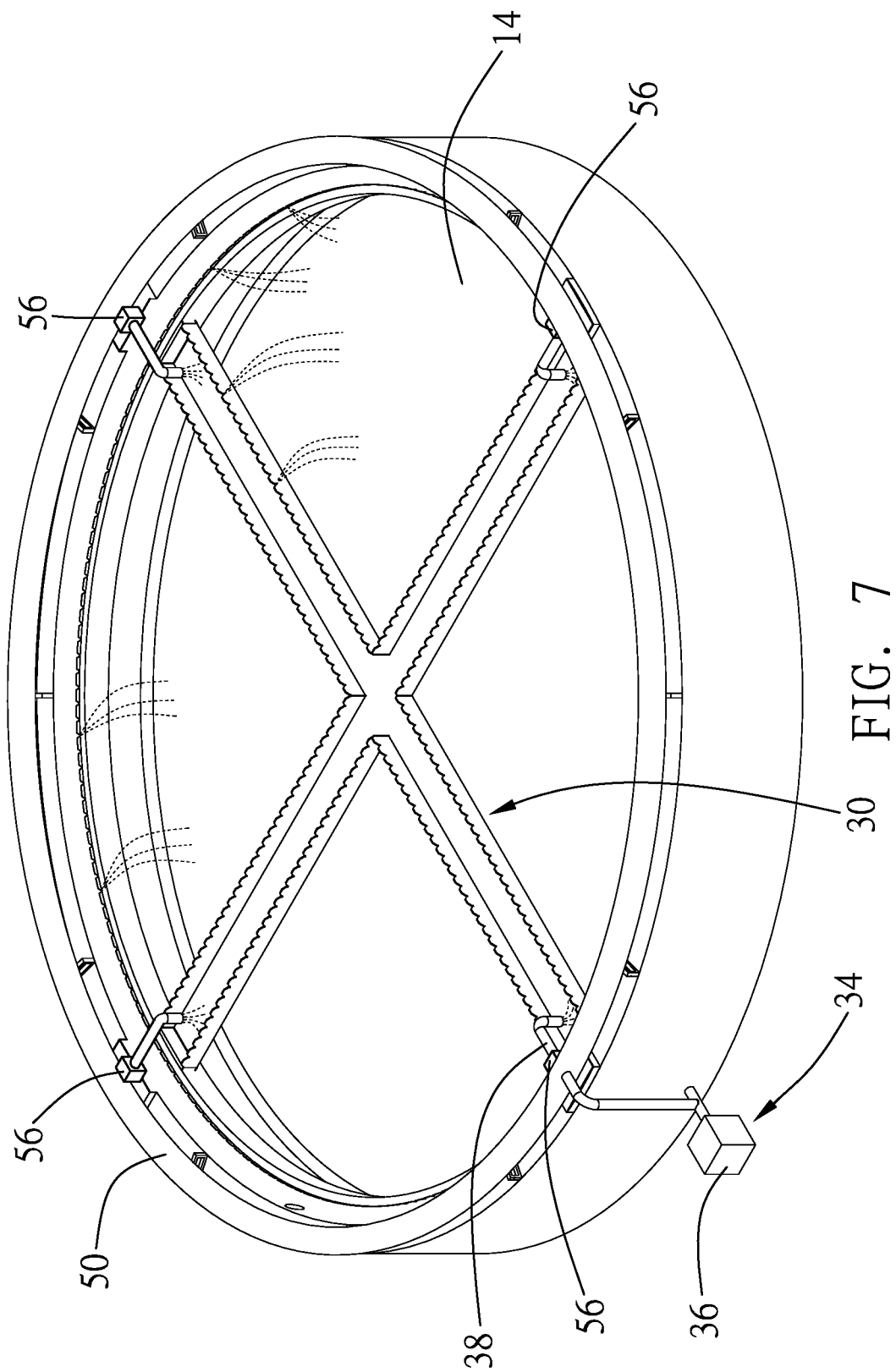
FIG. 7 is a perspective view of the preferred embodiment of the present invention, showing the second pump device.

As shown in FIG. 7, a circular pipe 50 is fixed on a top edge of the annular wall 14 of the tank member 10 and connected to the second pump 36 through a pipe. Several return pipes 38 are connected to the circular pipe 50. Wastewater pumped by the second pump 36 will flows to the second overflow weir 30 through the circular pipe 50 and the second return pipes 38 in sequence. Each of the return pipes 38 is provided with a control valve 56 to open or close the return pipes 38 respectively to control the time and quantity of the wastewater flows to the second overflow weir 30.

Figure 8:
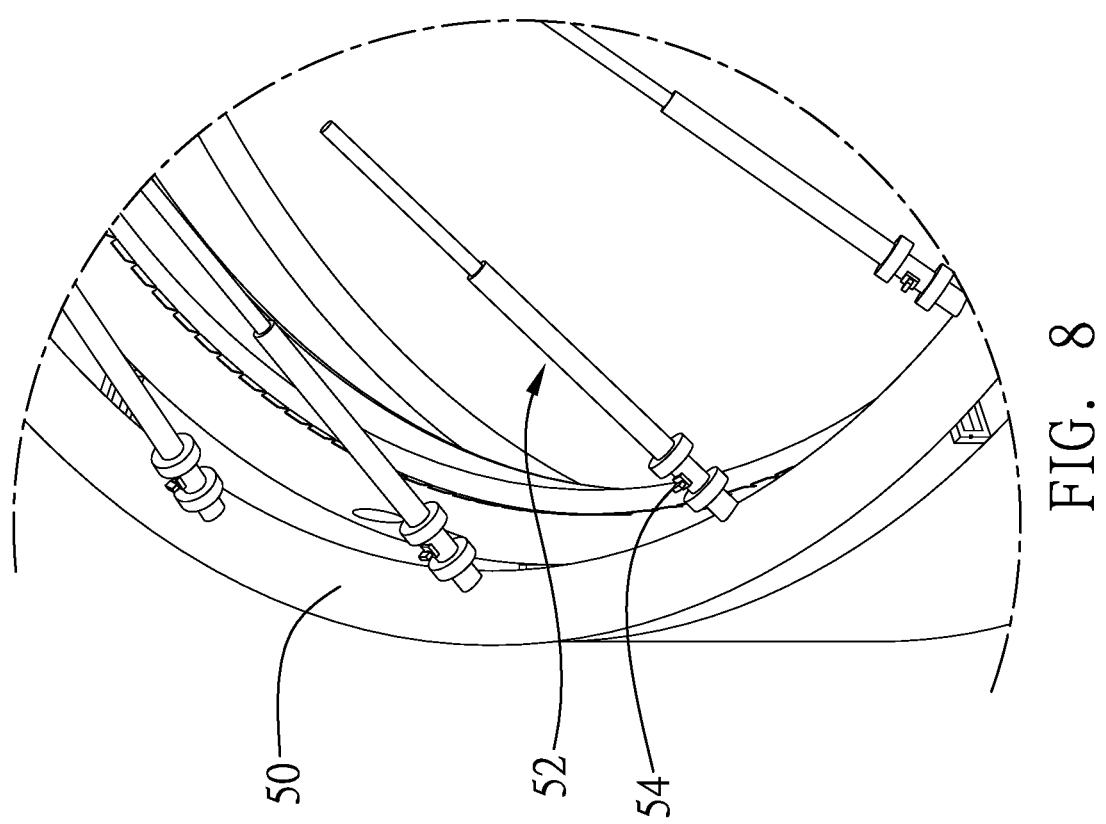
FIG. 8 is a perspective view in part of the preferred embodiment of the present invention, showing the nozzles.

As shown in FIG. 8, a plurality of nozzles 52 are connected to the circular pipe 50 with specified angles to eject the wastewater into the tank member 10. Each of which is provided with a controller 54, and the controllers 54 controls the nozzles 52 to open and closed by command to control the time and quantity of the wastewater ejected by the nozzles 52.

In conclusion, wastewater in the tank member 10 will be disturbed by the system of the first and the second pump devices 20, 34 and the first and the second overflow weir 16, 30 and the nozzles 52. As a result, dissolved oxygen in the wastewater is increased and the water temperature is decreased. It is helpful to the works of aerobic bacteria.

It must be pointed out that the embodiments described above are only some preferred embodiments of the present invention. All equivalent structures which employ the concepts disclosed in this specification and the appended claims should fall within the scope of the present invention.

What is claimed is:

1. A regulating tank of a wastewater treatment system, which receives wastewater from a primary settling tank, comprising:
  a tank member having an annular wall to receive the wastewater;
  a first overflow weir connected to an interior side of the annular wall of the tank member;
  a first pump device having a first pump and a first return pipe, wherein the first pump is connected to the tank member, and the first return pipe has an end connected to the first pump and an opposite end associated with the first overflow weir;
  wherein the first pump of the first pump device pumps the wastewater in the tank member to the first overflow weir through the first return pipe, and then the wastewater flows back to the tank member from the first overflow weir to disturb the wastewater in the tank member; and
  a second overflow weir having a plurality of terminals, wherein each of the terminals has an end connected to the first overflow weir to be communicated with the first overflow weir and an opposite end horizontally projecting to a center of the tank member, and all the terminals are arranged above the wastewater received in the tank member.

2. The regulating tank of claim 1, wherein the first overflow weir is provided with a plurality of stop plates; the stop plates are separated from each other to form a flowing gap between each two of the neighboring stop plates; the first overflow weir has a slot, in which the wastewater flows, and the stop plates are provided on a top of a sidewall of the slot of the first overflow weir, whereby the wastewater in the slot flows to the tank member via the flowing gaps when the slot is overflowing.

3. The regulating tank of claim 1, further comprising a second pump device having a second pump and a second return pipe, wherein the second return pipe has an end connected to the second pump and an opposite end associated with the second overflow weir, whereby the second pump of the second pump device pumps the wastewater in the tank member to the second overflow weir through the second return pipe, and then the wastewater flows back to the tank member from the second overflow weir.

4. The regulating tank of claim 1, wherein the second overflow weir is provided with a plurality of stop plates; the stop plates are separated from each other to form a flowing gap between each two of the neighboring stop plates; each of the terminals of the second overflow weir has a slot, in which the wastewater flows, and the stop plates are provided on tops of sidewalls of the slots of the terminals of the second overflow weir, whereby the wastewater in the slots flows to the tank member via the flowing gaps when the slots are overflowing.

5. The regulating tank of claim 1, further comprising a frame connected to the tank member, wherein the second overflow weir is connected to the frame to be positioned over the tank member.

6. The regulating tank of claim 1, further comprising a circular pipe and a second pump device, wherein the circular pipe is connected to the tank member; the second pump device has a second pump and a second return pipe; the second pump is connected to the circular pipe, and the second return pipe has an end connected to the circular pipe and an opposite end associated with the second overflow weir, whereby the second pump of the second pump device pumps the wastewater in the tank member to the second overflow weir through the circular pipe and the second return pipe, and then the wastewater flows back to the tank member from the second overflow weir.

7. The regulating tank of claim 6, further comprising a plurality of nozzles connected to the circular pipe, wherein the nozzles eject the wastewater in the circular pipe into the tank member.

8. The regulating tank of claim 7, wherein each of the nozzles is provided with a controller to open and close the nozzles by control.

9. The regulating tank of claim 1, wherein the opposite ends of the terminals of the second overflow weir are connected to each other.

10. The regulating tank of claim 1, wherein the opposite ends of the terminals of the second overflow weir are not connected to each other, and the second overflow weir has side overflow weirs with opposite ends connected to each two of the terminals of the second overflow weir.

* * * * *